United States Patent [19]
Segien, Jr.

[11] Patent Number: 5,741,003
[45] Date of Patent: Apr. 21, 1998

[54] CHILD-RESISTANT HANDLE

[75] Inventor: Donald James Segien, Jr., Chatsworth, Calif.

[73] Assignee: Emhart Inc., Newark, Del.

[21] Appl. No.: 855,479

[22] Filed: May 13, 1997

[51] Int. Cl.$^6$ .................................................. F16K 35/02
[52] U.S. Cl. .................. 251/95; 16/121; 74/25; 74/548; 74/553; 74/554; 192/69.7; 192/71; 251/96; 251/104; 251/110; 251/229; 403/1
[58] Field of Search ................... 16/121; 74/548, 74/552, 553, 554, 575, 25; 192/69.7, 69.8, 71; 251/95, 96, 101, 102, 104, 110, 229; 403/1

[56] References Cited

U.S. PATENT DOCUMENTS

| | | | |
|---|---|---|---|
| 2,501,008 | 3/1950 | Schramm | 74/548 |
| 2,602,351 | 7/1952 | Ringler et al. | 74/548 |
| 2,780,333 | 2/1957 | Reiser et al. | 74/548 X |
| 2,797,592 | 7/1957 | Marrapese | 74/548 |
| 2,829,538 | 4/1958 | Mueller | 251/96 |
| 2,838,270 | 6/1958 | Danielson | 251/110 |
| 2,899,841 | 8/1959 | Melloy | 74/548 |
| 3,001,551 | 9/1961 | Wyser | 251/96 |
| 3,193,243 | 7/1965 | Billington et al. | 251/96 |
| 3,210,040 | 10/1965 | Thurlow | 251/96 |
| 3,385,116 | 5/1968 | Carlson et al. | 74/10.54 |
| 3,473,408 | 10/1969 | Bettinger | 74/553 |
| 4,549,716 | 10/1985 | Warren | 251/96 |
| 4,691,895 | 9/1987 | Garff | 751/292 |
| 5,037,066 | 8/1991 | Kerger et al. | 251/96 |
| 5,490,660 | 2/1996 | Kamezawa | 251/96 |
| 5,513,831 | 5/1996 | Seward | 251/96 |
| 5,551,124 | 9/1996 | Zeringue | 251/96 |

Primary Examiner—George L. Walton
Attorney, Agent, or Firm—Harold Weinstein

[57] ABSTRACT

A child-resistant handle to be mounted to a valve stem to which is affixed a cogwheel adapter by a shoulder screw. The shoulder screw rotatably mounts the freely rotatable handle to the valve stem. The handle has an inverted cup shape that extends over and covers the cogwheel adapter. A clutch member connected to the handle with a resilient member engaging the clutch to normally keep the clutch member out of engagement with the cogwheel adapter. The clutch member linearly shiftable to engage the cogwheel adapter whereby rotation of the handle will cause a like rotation of the valve stem.

4 Claims, 6 Drawing Sheets

CHILD-RESISTANT HANDLE

BACKGROUND OF THE INVENTION

This invention relates to a child-resistant handle for a valve which is normally freely rotatable so that rotation of the handle will neither change the volume of water flow nor the temperature of the water, because its rotational movement is not transmitted to the valve stem. A clutch member carried by the handle must be activated by engagement with a cogwheel adapter affixed to the valve stem in order to have the rotation of the handle rotate the valve stem and thus, change the valve's water volume and temperature setting.

If children are left unattended with a conventional valve and valve handle, they can change the water volume, and thus the water temperature, to possibly result in an accidental scolding due to increasing the hot water flow. Numerous devices in the prior art have been tried to prevent accidental changing of the water temperature setting. However, the prior art devices had various disadvantages, such as, they were ineffective, or overly complex and generally expensive.

SUMMARY OF THE INVENTION

It is an object of the present invention to provide an improved child-resistant handle that children can less easily operate, that is simple to construct, economical to produce and highly reliable for adult operation.

It is another object of the present invention to provide a child-resistant handle that uses a handle that is freely rotatable and will only engage the valve stem after engagement of a clutch member carried by the handle.

It is another object of the present invention to require a positive linear movement of a clutch member before rotation of the handle will produce a change in the water volume and the water temperature.

Other objects, features and advantages of the present invention will become more fully apparent from the following detailed description of the invention, the appended claims and the accompanying drawings.

DETAILED DESCRIPTION OF THE INVENTION

Figure 1:
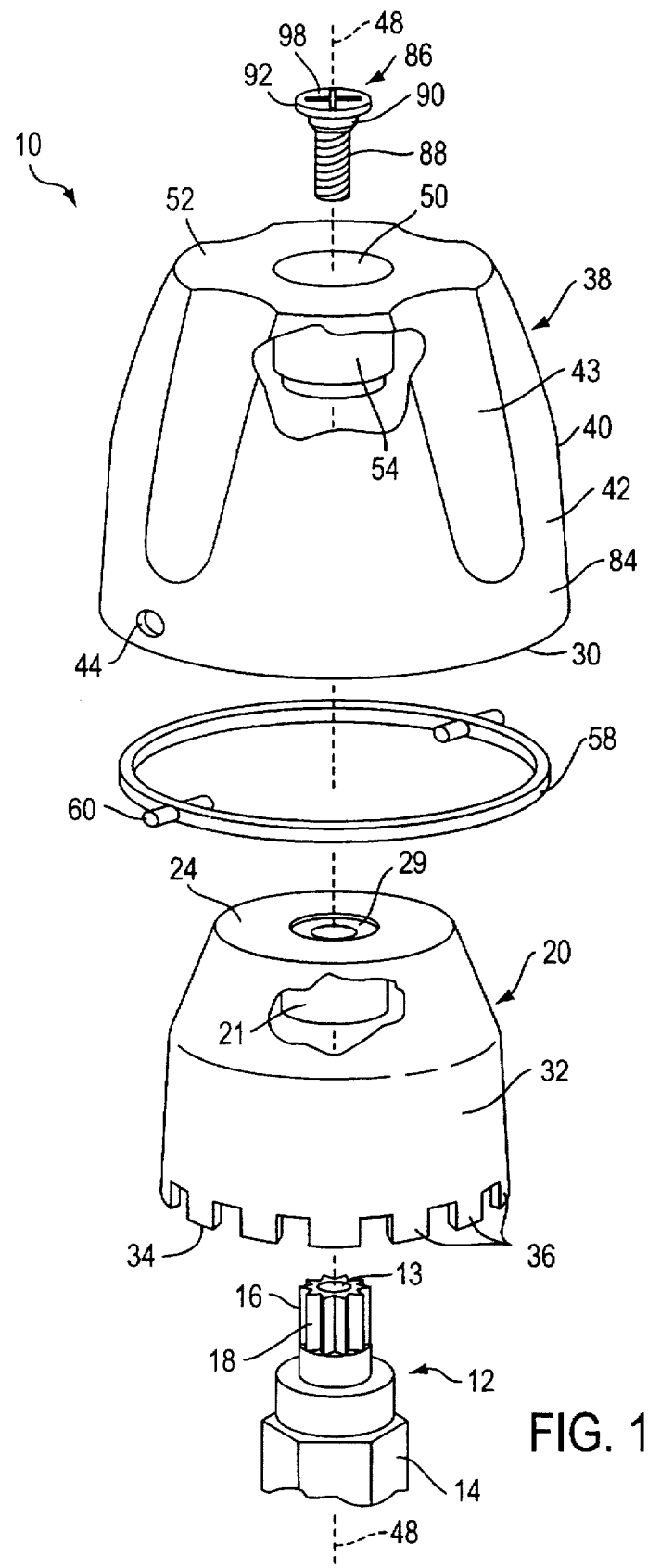
FIG. 1 is an exploded perspective view, partly broken away, of a preferred embodiment of the child-resistant handle of the present invention.

The preferred, i.e. the first, embodiment of the present invention is shown in FIGS. 1, 2, 3 and 4 wherein FIG. 1 shows a child-resistant handle assembly 10 in an exploded perspective view that depicts a conventional valve stem that is connected to a water valve (not shown) through a coupling 14. The upper end 16 of the valve stem 12 has a tapped hole 13 and a plurality of splines 18 formed on the upper end 16 of the valve stem 12. Rotation of the valve stem 12 controls the flow of the water through the water valve and can be used for either hot or cold water valves, but because of the temperature factor, the present invention will be especially useful for hot water valves. The child-resistant handle assembly 10 shown in FIGS. 1, 2 and 3 includes a cogwheel adapter 20 with a hub 21 having splines 22 formed on the inside of an enlarged opening 23 extending upwardly from the bottom of the hub 21 about half way of its length. The splines 22 mate with the splines 18 of the valve stem 12 to mount the cogwheel adapter 20 to the valve stem 12 so that, in assembled position shown in FIGS. 2 and 3, rotation of the cogwheel adapter 20 will also rotate the valve stem 12. The hub 21 extends downwardly a short distance from the flat topside 24 of the cogwheel adapter 20. Above the splines 22 is a reduced diameter opening 27 that continues the opening 23 and terminates in an upwardly biased taper 28 that ends in a circular opening 29 which reaches the flat topside 24. Thus the openings 23, 27 and 29 and the taper 28 extend to form differently diametered, continuous throughholes in the hub 21. The topside 24 extends radially outwardly from the central opening 29 to turn downwardly into a skirt 32, the bottom 34 of which surrounds the valve stem 12 and extends to cover most of the coupling 14. A plurality of teeth 36 are formed on the skirt 32 to extend upwardly from the bottom 34 with alternate openings 37 therebetween.

Figure 2:
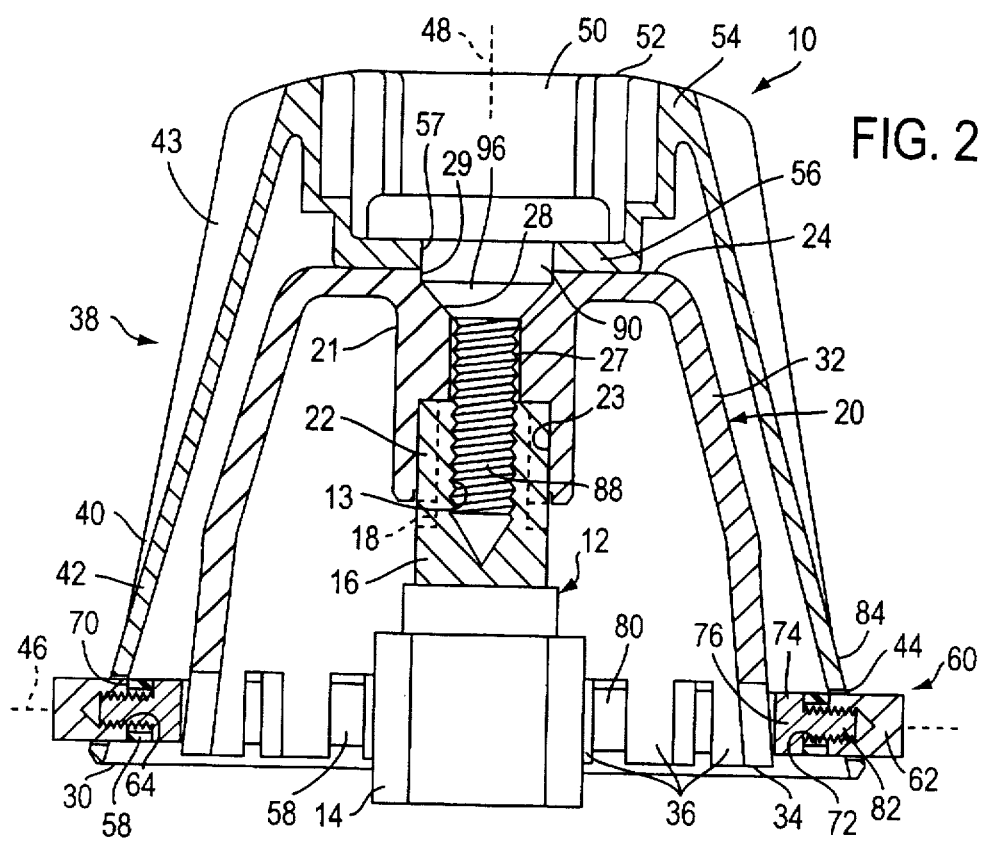
FIG. 2 is a sectional side elevational view of the child-resistant handle of the present invention shown in FIG. 1 with the clutch member out of engagement with the cogwheel adapter and the handle free to rotation relative to the valve stem.
Figure 3:
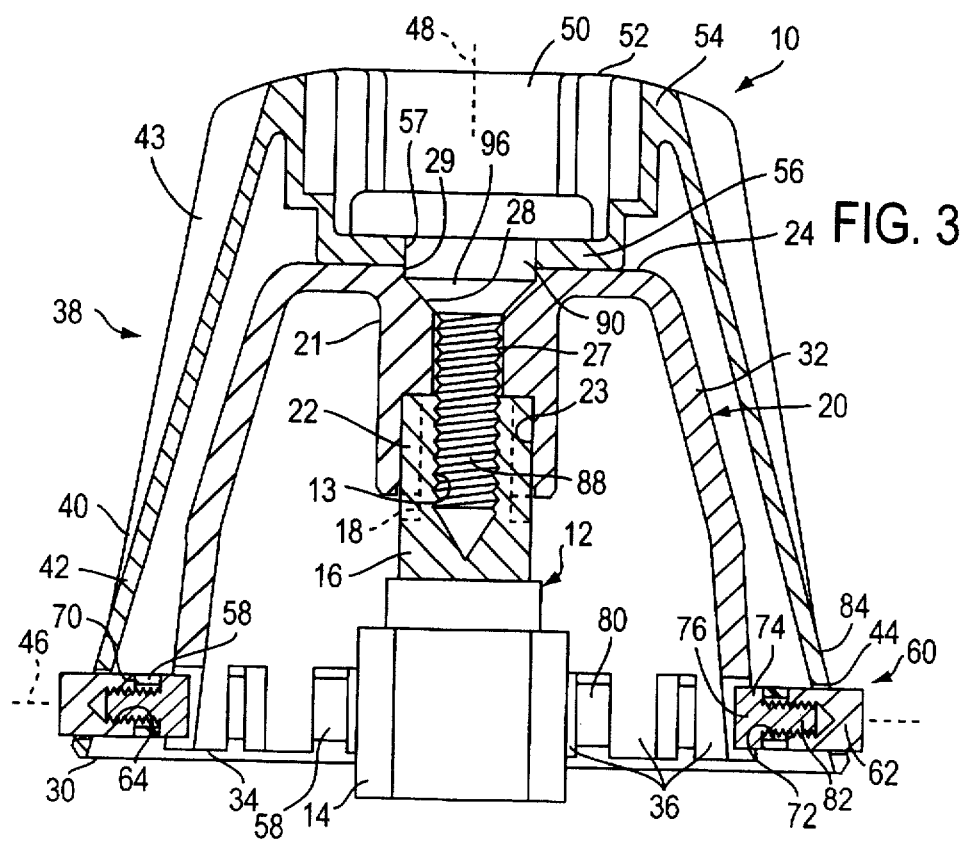
FIG. 3 is a sectional side elevational view of the child-resistant handle of the present invention shown in FIG. 1 with the clutch member engaging the cogwheel adapter affixed to the valve stem to cause rotation of the handle to rotate to valve stem.

A handle 38 is formed in the shape of an inverted cup 40 having a side shell 42 that extends over and slightly below the cogwheel adapter 20. The handle 38 has optionally formed recess depressions 43 extending downwardly as shown to terminate above the bottom 30 of the shell 42 to provide finger grips on the handle 38 to facilitate turning thereof. A pair of diametrically disposed holes 44, shown in FIGS. 1, 2 and 3, are formed in the shell 42 to lie a plane 46 in which the teeth 36 of the cogwheel adapter 20 pass through. The plane 46 is substantially perpendicular to the axis 48 of the valve stem 12. The handle 38 has an enlarged central opening 50 that extends from its upper end 52 with an annular side wall 54 to terminate in an inwardly extending annular horizontal flange 56 that will lie on the flat top side 24 of the hub 26. A smaller opening 57 spans the circular space of the flange 56 and is substantially of equal diameter as that of the opening 29. A resilient ring 58 shown in FIGS. 1, 2 and 3 is formed of a suitable plastic or rubber material.

Figure 4:
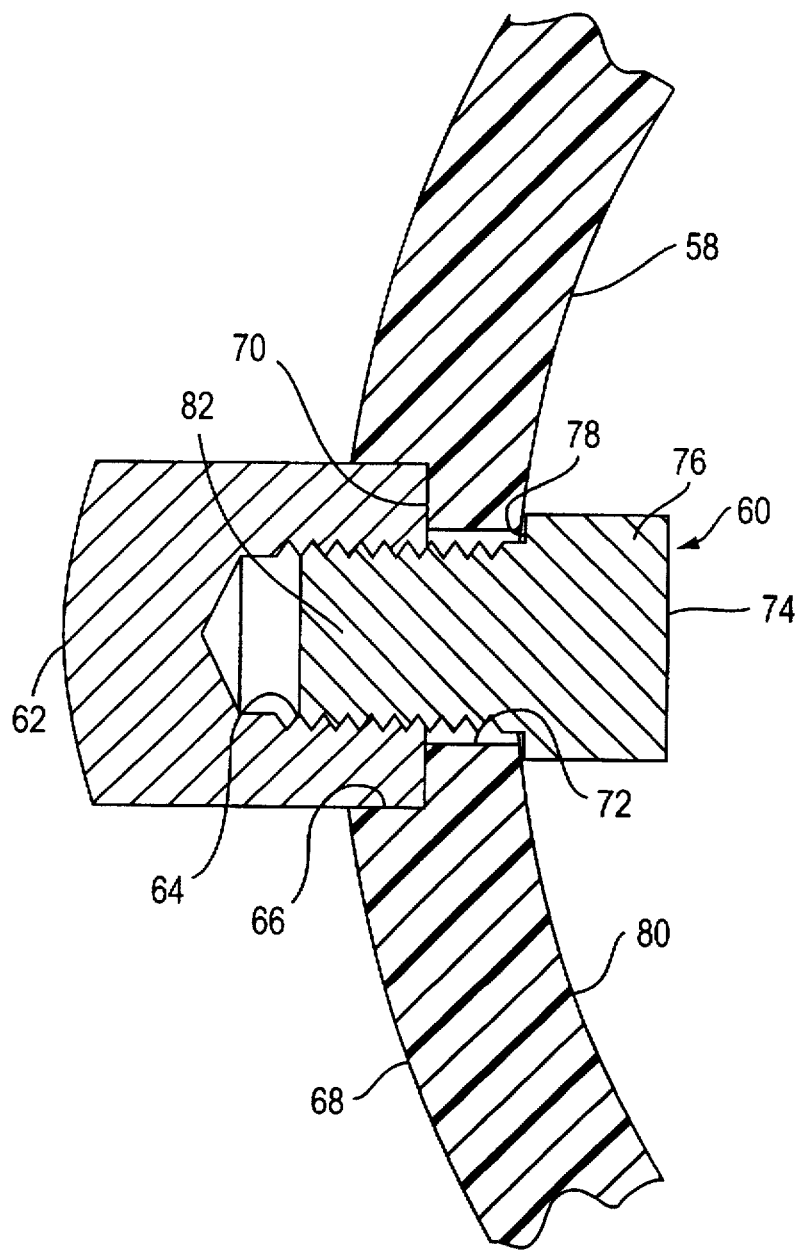
FIG. 4 is a partial sectional top plane view of details of the clutch member of the present invention.

A clutch member 60 may be integrally formed with the ring 58 in the shape shown or any other suitable shape for the purposes to be described, but, in the preferred embodiment herein, it is shown in FIG. 4 to be made of an interconnected brass external button 62 having a threaded opening 64 and disposed in a recess 66 formed on the outer circumference 68 of the ring 58. The recess 66 extends about one half of the thickness of the ring 58 to terminate in an annular bottom edge 70 that borders on an opening 72 that the recess 68 is formed in. A threaded member 74, which may also be made of brass, has an enlarged head 76 extends inwardly of the ring 58 with the inner end 78 of the head 76 engaging the inner wall 80 of the ring 58 about the opening 72. Threaded member 74 has a smaller diameter threaded section 82 which extends from the head 76 to be threadedly received in the threaded opening 64 of the button 62 so that tightening of the threaded member 74 within the button 62 engages the lower end thereof with the bottom edge 70 of the recess 66 and the inner end 78 contacts the inner wall 80 to clamp the clutch member 60 to the ring 58. As shown in FIG. 1, there are a pair of diametrically mounted clutch members 60 mounted on the ring 58 adapted to be disposed adjacent each of the holes 44 so that temporarily squeezing the buttons 62 towards each other decreases the diameter of the ring 58 sufficiently to permit each of the buttons 62 to be mounted within each of the holes 44, as shown in FIGS. 2 and 3, to mount the ring 58 at the lower end 84 of the handle 38 as the outer circumference 68 of the ring 58 is substantially the same diameter as that of the shell 42 adjacent the holes 44 so as to provide frictional engagement therebetween. This places the clutch members 60 in the same plane 46 as that of the teeth 36 of the cogwheel adapter 20 for purposes more fully described hereinafter.

A shoulder screw 86, shown in FIGS. 1, 2 and 3 has a threaded lower section 88 of the same diameter and thread specifications as that of the tapped hole 13 of the valve stem 12. A larger diameter circular shoulder section 90 is sized slightly smaller than the circular opening 57 so as to permit a loose engagement with the flange 56 so as to permit the handle 38 to be freely rotatable relative to the fixed shoulder screw 86. The upper end 92 has a head 94 of larger diameter than the diameter of the shoulder section 90 but a smaller diameter than that of the opening 50. A tapered section 96 extends from the shoulder section 90 to the threaded lower section 88 to provide a smooth transition from the larger to the smaller diameter and also engages a like tapered section 28 of the hub 26. The axial length of the shoulder 90 is greater than the thickness of the annular flange 56 so that, when the screw 86 is connected to the valve stem 12, the tapered section 96 will engage the taper 28 as both are formed at the same angle. It is the tapered section 96 which limits the axial decent of the screw 86 into engagement with the valve stem 12, while locking the cogwheel adapter 20 to the valve stem 12.

The handle 38 is free to rotate about the cogwheel adapter 20 and the shoulder section 90 but is trapped from axial movement by the location of the flange 56 between the flat topside 24 and the enlarged head 94, though free to freely rotate therebetween. Accordingly, the act of turning the handle 38 will not change the flow volume or temperature setting of the valve. Whenever an operator wants to change the setting, the button 62 will be depressed inwardly toward each other to force the head 76 of the threaded member 74 into the openings 37 of alternate teeth 36 to lock the handle 36 to the cogwheel adapter 20 so that, so long as the buttons 62 remain depressed, turning of the handle 38 will produce a like turning of the valve stem 12. Thus, rotation of the handle 36 changes the volume of flow and the temperature of the flow by increasing or decreasing the same, depending on whether the handle 36 is rotated clockwise or counter-clockwise, as desired. Release of the buttons 62 removes the threaded member 74 from the teeth 36 of the cogwheel adapter 20 so that the clutch member 60 is disengaged. Once again, rotation of the handle 36, no longer engaged with the cogwheel adapter 20, will not affect or change the position of the valve stem 12 and, therefore, the flow through the valve will remain unchanged.

Figure 5:
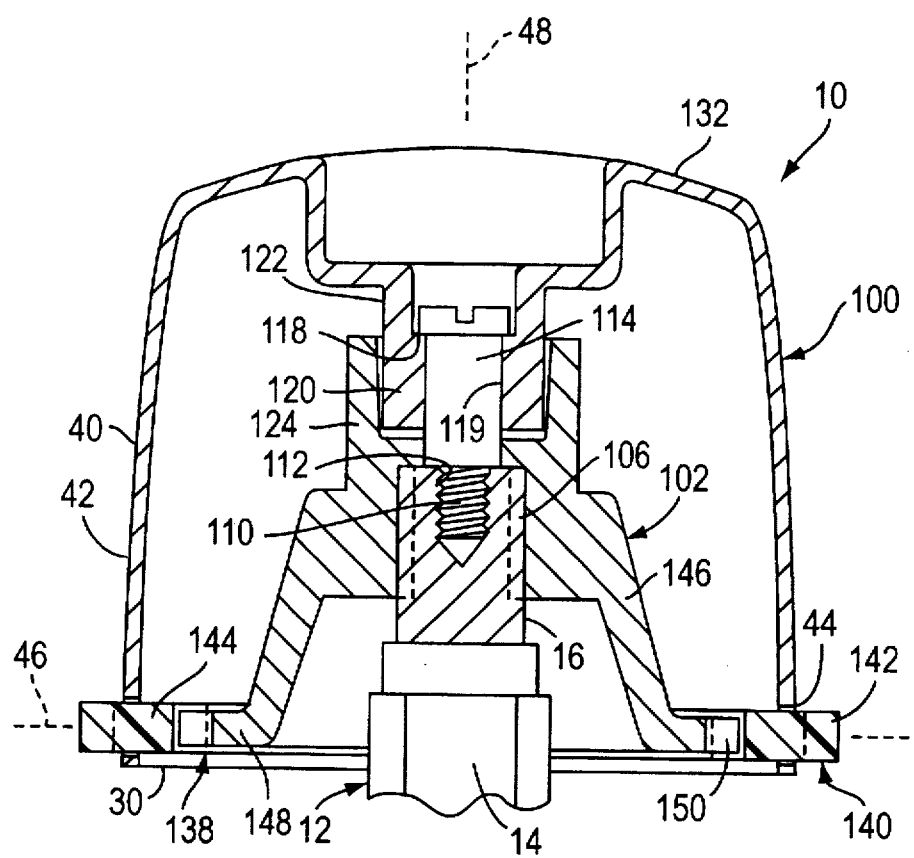
FIG. 5 is a second embodiment of the child-resistant handle of the present invention showing a sectional side elevational view similar to that shown in FIG. 2 with modified components.

In FIG. 5, a second embodiment of the present invention is shown and the components are functionally, if not physically, similar to the components of the first embodiment of the present invention described hereinbefore in FIGS. 1 through 4. In some instances, the same reference characters will be used and in other instances different reference characters will be used. The child-resistant handle assembly 10 has a handle 100 that enclosed a cogwheel adapter 102 fixedly mounted to a valve stem 12 by a spline 106 connection at the upper end 16 of the valve stem 12. The valve stem 12 is connected to a water valve (not shown). A shoulder screw 108 has a threaded section 110 which is threadedly connected to a tapered hole 112 formed in the upper end 108 of the valve stem 104. A larger diameter shoulder section 114 extends from the threaded section 110 and the enlarged slotted head 116. The head 116, as shown in FIG. 5, extends over the topside 118 of a flange 120 and extends radially inwardly to terminate in a circular opening 119 formed in a hub 122. The flange 120 extends from the bottom of the hub 122 to the topside 118 thereof a little more than half the axial length of the hub 122. The hub 122 is centrally disposed on the inside of the handle 100. An upwardly extending annular flange 124 of the cogwheel adapter 102 extends around the hub 122 a little more than halfway over its length. The inner diameter of the flange 124 is slightly larger than the outer diameter of the hub 122 so that the handle is free to rotate relative to the cogwheel adapter 102 about the axis 48. The axial length of the shoulder section 114 is slightly greater than the axial length of the flange 120 so that when the shoulder screw 108 is connected to the valve stem 104, the handle 100 will not be clamped to the valve stem 12, but is free to rotate relative to the screw 108 (and the cogwheel adapter 102). Also, the diameter of the circular opening 119 is slightly greater than the diameter of the shoulder section 114 but substantially smaller than the diameter of the head 116. Thus, the handle 100, though free to rotate, is rotatable connected to cannot be axially removed from the assembly 10. The upper end of the hub 120 turns outwardly to form an annular horizontal flange 128 whose outer end turns vertically upwardly to form an annular side wall 130 that extends into a horizontal topside 132. The topside 132 has an enlarged opening 134 which steps down to a smaller opening 136 of slightly larger diameter than the diameter of the head 116. The openings 134, 136 and 119 form a continuous through-hole in the handle 100 which extends downwardly from the topside 132 thereof.

The handle 100 is formed in the shape of an inverted cup 40 having a side shell 42 extending from the topside 132 and terminating in a bottom 30 that extends slightly below the bottom of the cogwheel adapter 102. A pair of diametrically disposed holes 44 are formed on opposite sides of the shell 42 to lie in a plane 46 just above the bottom 30 of the handle 100. The plane 46 is perpendicular to the axis 48 of the valve stem 12. A resilient ring 138, made of rubber or plastic, is formed with an integral clutch member 140 that, in mounted position, extend through the holes 44 to shiftably mount the ring 138 within the handle 100. The clutch member 140 could also have been formed separate from the ring 138 and connected thereto similar to that shown and described in the first embodiment of the present invention. The clutch member 140 has an outwardly extending button 142 and an inwardly extending projection 144. The cogwheel adapter 102 has a downwardly extending skirt 146 which flares slightly outwardly from the annular flange 124 to terminate in an outwardly extending annular flange 148 having a plurality of teeth 150 formed about the circumference of the flange 148. The solid line representation of the clutch member 140, shown in FIG. 5, normally is out of engagement with the cogwheel adapter 102 so that the handle 100 is free to rotate without rotating the valve stem 104. Whenever it is desired to change the setting of the valve stem 104, the buttons 142 of the clutch members 140 will be depressed to engage and lock the projections 144 between adjacent teeth 150, as shown in the dotted line representation of the clutch member 140 in FIG. 5, so that rotation of the handle 100 will also rotate both the cogwheel adapter 102 and the valve stem 104 and, thus, change the water valve setting for the volume of flow and the temperature of flow, as desired.

Figure 6:
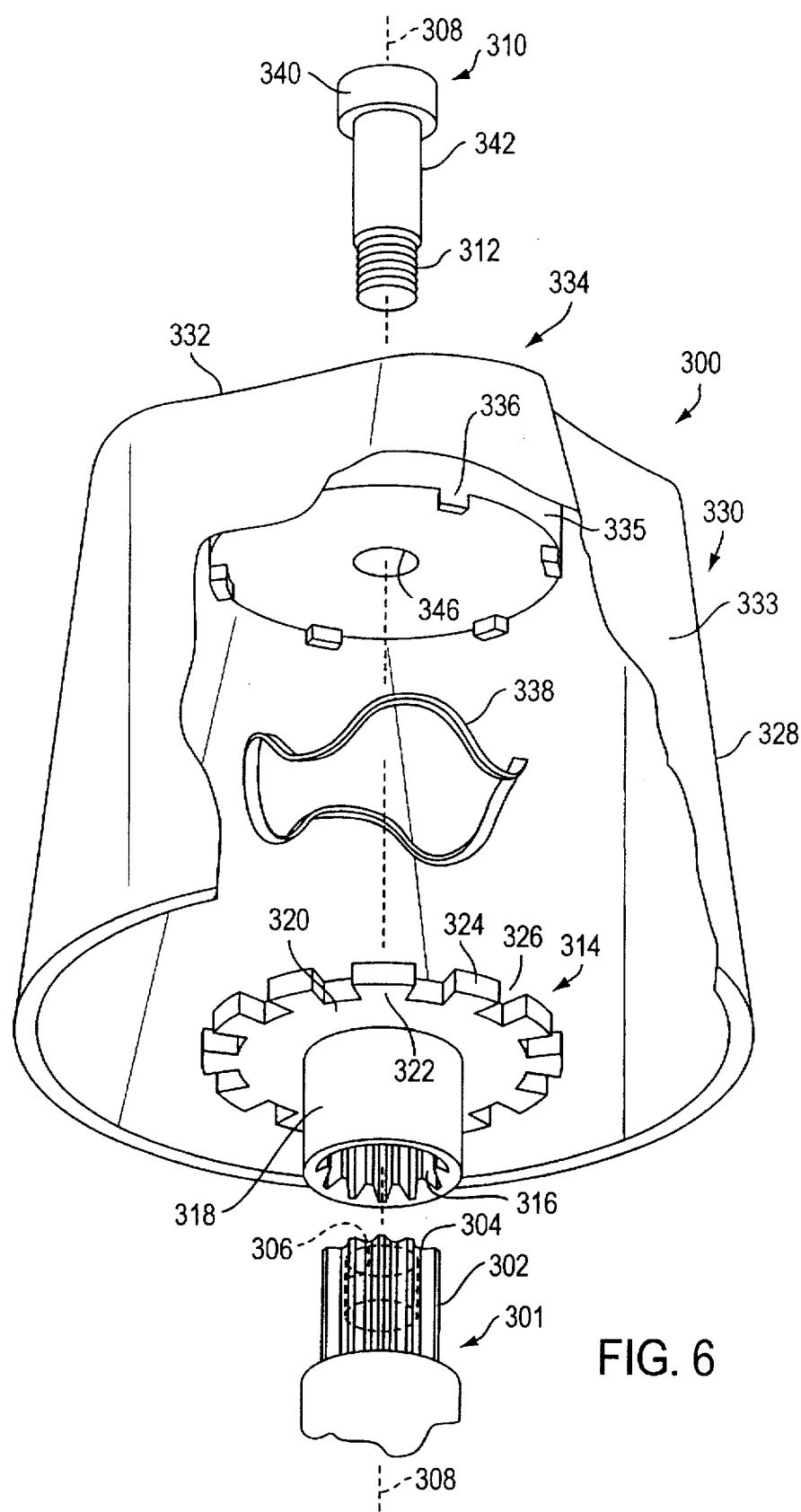
FIG. 6 is an exploded perspective view, partly broken away, of a third embodiment of the child-resistant handle of the present invention.
Figure 7:
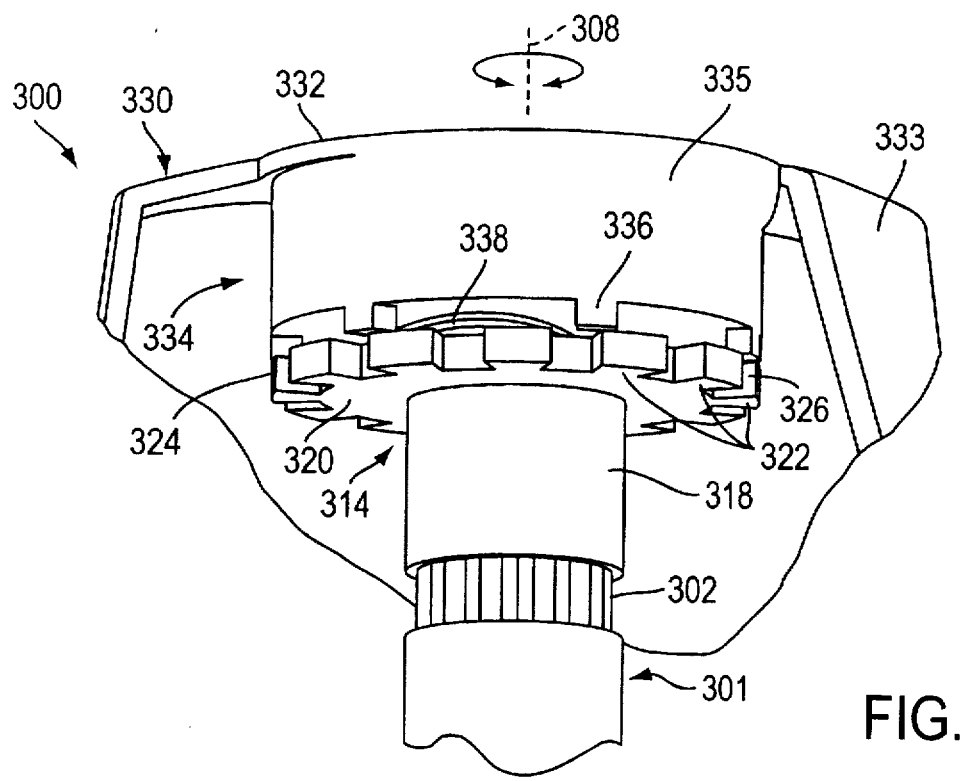
FIG. 7 is a partial perspective view of the child-resistant handle of the present invention shown in FIG. 6 with the clutch member out of engagement with the cogwheel adapter and the handle free to rotate relative to the valve stem.
Figure 8:
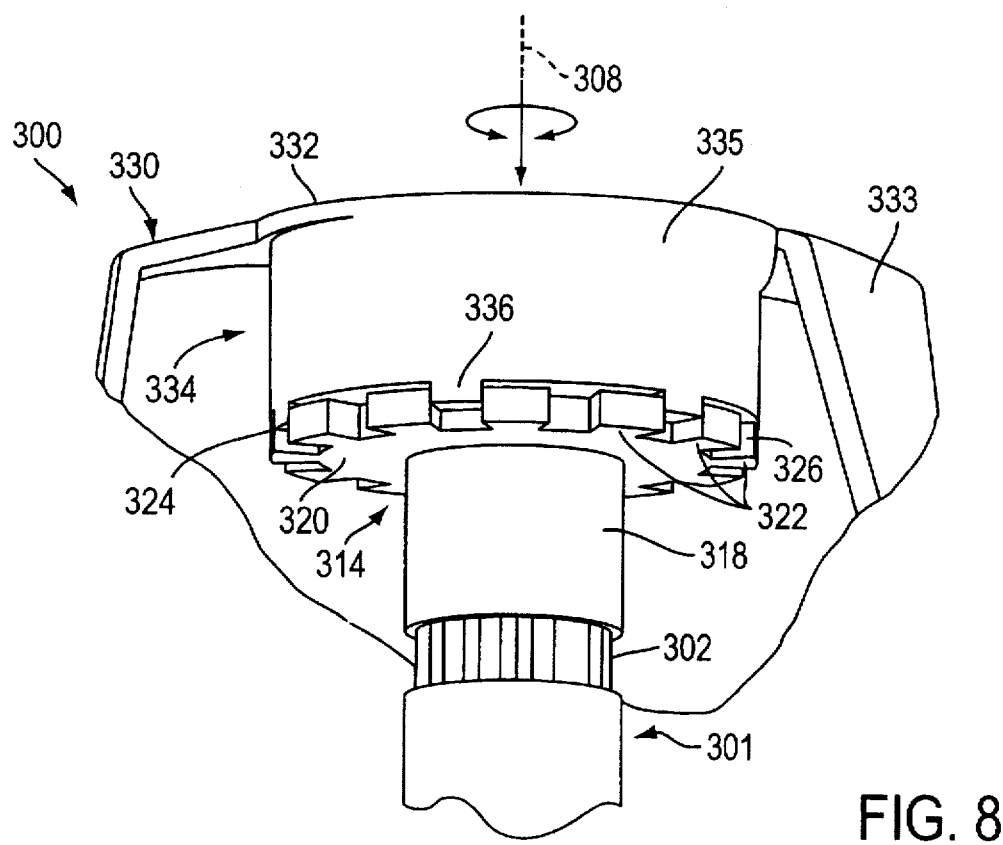
FIG. 8 is a partial perspective view of the child-resistant handle of the present invention shown in FIG. 6 with the clutch member engaging the cogwheel adapter affixed to the valve stem to cause rotation of the handle to rotate the valve stem.

In FIGS. 6, 7 and 8, a third embodiment of the present invention is shown in which a handle assembly 300 will be mounted upon a valve stem 301 that will be connected to a water valve (not shown) via a conventional coupling (not shown) of the type shown and described in the first and second embodiments of the present invention. The valve stem 301 has a splined upper end 302 which terminates in a flat top 304. A tapered hole 306 is shown in dotted line representation in FIG. 6 to extend downwardly from the top 304 and in the upper end 302 along the axis 308 of the valve stem 301. A shoulder screw 310 shown in FIG. 6 has a lower threaded section 312 that is threadedly received in the tapered hole 306 to mount a cogwheel adapter 314 to the valve stem 301. The splines 316 of the cogwheel adapter 314 extend upwardly from the open bottom of hub 318 on the inside thereof and are interconnected to the splined upper end 301 of the valve stem 301. A horizontal flange 320 is formed at the upper end of the hub 318 with a plurality of horizontally disposed teeth 322 extending inwardly from the circular outer circumference 324. Spaces 326 are formed between adjacent teeth 322.

A shell 328 of a handle 330 in assembled position will cover the cogwheel 314. The handle 330 is shaped in the form of an inverted cup, with the shell 328 the sides of the cup and the top member 332 in the position of the bottom of the cup. A plurality of recesses 333 serving as finger grips are formed about the shell 328 for purposes of turning the handle 330 easier. The shell 328 is hollow and a clutch member 334 is formed integrally with the handle 330 on the underside of the top member 332. The clutch member 334 has a circular disc 335 having a diameter equal to that of the flange 320. Short downward projections 336 are formed on the underside of the disc 335 to extend a short distance radially inwardly from the outer circumference of the bottom of the disc 335 of the clutch member 334. The projections 336 are teeth-like and have an axial length of about one half of that of the teeth 322 of the cogwheel 314. The projections 336 are spaced from each other about the circumference of the disc 335 a distance equal to the span between two teeth 322 so that, as shown in FIG. 8, upon mating with the teeth 322, the projections 336 will enter every second space 326.

A wavy washer 338, best shown in FIG. 6, is disposed upon the cogwheel adapter 318, normally to bias the clutch member 334 away from the cogwheel adapter 318 and, in an inoperative position as shown in FIG. 7, wherein the handle 330 is freely rotatable without changing the setting of the water valve. The shoulder screw 310 has a head 340 of larger diameter than the diameter of the shoulder section 342 that is axially elongated to permit the handle 328, which is journaled thereon, to be shifted axially relative to the shoulder screw 310 for purposes more fully described hereinafter. The shoulder section 342 of the screw 310 is intermediate the head 340 and the threaded section 312. The clutch member 334 has a central axial hole 346 passing therethrough and having a diameter slightly larger than that of the shoulder section 342 of the screw 310. In the assembled position shown in FIG. 7, the handles is mounted by the shoulder screw 310 to the valve stem 301, but is freely rotatable relative to the valve stem 301 and, consequently, rotation of the handle 328 will not change the water valve setting. Accordingly, without resulting in turning the valve stem 301, anyone can turn the handle 328 and not change the rate of water flow or the temperature of the water flow. The rotary motion of the handle 328 is indicated by the double headed circular arrow located above the handle 328 about the axis 308.

Whenever it is desired to operate the water valve, the person operating the water valve will depress the handle 328 axially to engage the projections 336 within the flange teeth 322. The motion required is indicated by 1) the double headed circular arrow and 2) the downwardly directed axial arrow, which arrows are depicted above the handle 328 in FIG. 8. If the projections 336 are not aligned with the spaces 326, it will be necessary to rotate the handle 328 clockwise or counter-clockwise sufficiently to align the parts while maintaining the downward pressure. Once the clutch member 334 is coupled to the cogwheel 314, rotation of the handle 328 results in like rotation of the valve stem 301 to produce the desired change in the setting of the water valve's rate of flow and temperature. In order to axially shift the handle 328 downwardly from the position shown in FIG. 7 to the position shown in FIG. 8, it is necessary to overcome the force of the spring 338. After adjusting the water valve through turning of the valve stem 301, the handle 328 is released and the force of the spring 338 again separates the clutch member 334 and the cogwheel adapter 318 to resume the position shown in FIG. 7, wherein the handle 328 is free to rotate without producing a change in the water flow of temperature of the water flow.

It will also be appreciated that the above-described invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

What is claimed is:

1. A child-resistant handle assembly comprising;

a. a valve stem;

b. a cogwheel adapter affixed to and mounted to surround the valve stem;

c. a handle rotatable mounted to the valve stem and disposed about the cogwheel adapter in spaced relationship thereto;

d. the cogwheel adapter having a plurality of annular gear teeth lying in a plane perpendicular to the axis of the valve stem;

e. a pair of openings defining a pair of holes formed in the lower end of the handle lying in the plane of the annular gear teeth of the cogwheel adapter;

f. a resilient annular segmented member disposed to surround a portion of the cogwheel adapter inwardly of the handle; and g. a clutch member having a pair of buttons affixed to the segmented member, with each of the buttons formed with an outer end and an inner end, and having the button resiliently and slidably carried in the holes of the handle and lying in the plane of the teeth of the cogwheel adapter with the outer ends of the buttons extending outwardly of the holes of the handle to be engaged and depressed to cause deformation of the segmented member and to force the inner ends of the buttons, normally out of engagement with the teeth of the cogwheel adapter, to engage the teeth of the cogwheel adapter, whereby rotation of the handle will cause the cogwheel adapter and the valve stem to turn.

2. The combination claimed in claim 1 wherein:

a. the handle is formed in the shape of an inverted cup;

b. a pair of openings define holes formed diametrically opposite each other in the lower end of the inverted cup and lying in the same plane as that of the teeth of the cogwheel adapter;

c. the clutch member having a pair of buttons, each having an outer end and an inner end, with the outer end extending outwardly of the holes;

d. a resilient annular segmented ring member disposed on the inside of the cup in spaced relationship with the cogwheel adapter and to which the buttons are affixed; and e. the inner end of the buttons projecting in the direction of the cogwheel adapter whereby, upon the outer end of the button being depressed to deform the segmented ring member, the inner ends thereof will engage the teeth of the cogwheel adapter to lock the handle in engagement with the cogwheel adapter.

3. A child-resistant handle assembly comprising:

a. a free turning handle;

b. a clutch member carried by the handle;

c. a valve stem to which the handle is connectable, normally to turn thereabout;

d. a cogwheel adapter affixed to and surrounding the valve stem;

e. a resilient annular segmented member disposed to surround a portion of the cogwheel adapter, the segmented member connected to the clutch member, normally to urge the clutch member out of engagement with the cogwheel adapter;

f. a pair of openings formed adjacent the bottom of the handle;

g. the clutch member having a pair of buttons resiliently and slidably disposed within the openings of the handle to mount into engagement with the clutch member, adapted to be activated independently or jointly; and each button, having an outer end and an inner end with the outer end of the button extending outwardly of the opening to be engaged by an operator and, upon depressing the outer end, the inner end of one or both the buttons being forced into locking engagement with the cogwheel adapter as the segmented member deforms, whereby rotation of the handle will cause a like rotation of the cogwheel adapter and the valve stem.

4. The combination claimed in claim 3, wherein:

a. a shoulder screw rotatably mounts the handle to the valve stem and affixes the cogwheel adapter thereto;

b. the handle has an inverted cup shape the extends over the cogwheel adapter to cover the same;

c. the cogwheel adapter has a plurality of teeth formed adjacent the bottom thereof;

d. the openings define a pair of holes formed in the handle at the lower end thereof adjacent the teeth of the cogwheel adapter;

e. the resilient annular segmented member defines a ring segment disposed on the inside of the handle at the level of the hole normally to hold the inner end of the buttons in spaced relationship to the teeth of the cogwheel adapter; and f. the outer end of the buttons extending through the holes whereby depression of the outer end of the button will cause deformation of the segmented member upon the inner end of the buttons lockingly engaging the teeth of the cogwheel adapter.

* * * * *